United States Patent [19]

Hirabayashi et al.

[11] 3,881,819

[45] May 6, 1975

[54] CASSETTE-TYPE HOLOGRAM GRAPHIC TABLET

[75] Inventors: Isamu Hirabayashi; Mitsuhito Sakaguchi; Masahiro Moriwaki, all of Tokyo, Japan

[73] Assignee: Nippon Electric Company, Limited, Tokyo, Japan

[22] Filed: Nov. 14, 1973

[21] Appl. No.: 415,516

[30] Foreign Application Priority Data

Nov. 22, 1972 Japan .............................. 47-133920

[52] U.S. Cl. .......................................... 355/2; 355/75

[51] Int. Cl. ............................................ G03b 27/00

[58] Field of Search ...................... 355/2, 32, 75, 76; 354/123, 124

[56] References Cited

UNITED STATES PATENTS

| | | | |
|---|---|---|---|
| 620,036 | 2/1899 | Jenkins | 354/123 |
| 2,341,098 | 2/1944 | Hansen | 355/76 |
| 2,847,307 | 8/1958 | Thiele | 355/32 X |
| 3,547,532 | 12/1970 | Grant | 355/75 |
| 3,604,328 | 9/1971 | Nakagawa | 355/75 |

*Primary Examiner*—John M. Horan

*Attorney, Agent, or Firm*—Hopgood, Calimafde, Kalil, Blaustein & Lieberman

[57] ABSTRACT

A mounting device to firmly and exactly position a demountable holographic cassette plate within a housing includes one or more reference surfaces within the housing to position the plate at an exact predetermined position relative to the housing. A pressure roller and one or more electromagnets are mounted within the housing to hold the plate firmly against the reference surfaces, and leaf springs are mounted on the cassette to prevent the cassette from moving up or down along the surfaces.

3 Claims, 2 Drawing Figures

CASSETTE-TYPE HOLOGRAM GRAPHIC TABLET

BACKGROUND OF THE INVENTION

The present invention relates generally to holographic tablet devices and, particularly to those devices of the type having holographic code plates in the form of cassettes which greatly facilitate the operation.

Holographic tablet devices are usable as input devices for a computer system or the like. Two different holographic tablet devices have so far been proposed by the inventors of the present invention. One such device is of the type proposed in the U.S. Pat. No. 3,658,402, in which each elementary hologram on the code plate carries positional data describing a point on the $x$–$y$ plane. When illuminated by light rays from a light pen carried on a pantograph, each of the elementary holograms on the plate converts the light rays into an array of coded light spots which are then photoelectrically converted into a digital signal. As the light pen is moved the light rays propagating therefrom are successively converted into a series of parallel digital codes representing the light pen locus which are supplied in sequence to the computer.

Another type of tablet device is proposed in the Japanese Pat. Application No. 87891/71. In this proposed system, each of the elementary holograms represents a digital code for a character, such as a Chinese character and an alphanumeric. Thus, by relating a character plate, having various characters arranged in lines and columns, to the code plate through a pantograph, coded data is obtained in one-to-one correspondence to the characters and alphanumerics indicated on the character plate.

In the device disclosed in Japanese Pat. Application No. 87891/71, the column and line arrangements of the holographic data recorded on the code plate must be in a fixed relation with the arrangements of the characters or the like shown on the input display plate, to secure correspondence therebetween. Whereas, in the device disclosed in U.S. Pat. No. 3,658,402, the input display plate to which the input information is supplied need not be in strict spatial relationship with the code plate, because what is to be converted into digital data in this case is a position on the input display plate.

While devices of the type described in Japanese Pat. Application No. 87891/71 are expected to find broad application in the field of input device for Chinese characters, they lack flexibility, because the arrangements of the elementary holographic codes and the Chinese characters must be in fixed relationship. To increase flexibility, devices of this type must be adapted to the simultaneous replacement of the code plate and the input display plate. In some cases, this device may also be used as the input device for handwritten data.

Therefore, it is an object of the invention to provide a multipurpose holographic tablet device operable not only as the input device for handwritten data but as a character input device adaptable to any character ar- arangement.

It is another object of the invention to provide a holographic tablet device operable without any need for adjusting the positional relationship between the input display plate and the code plate.

SUMMARY OF THE INVENTION

Mounting apparatus is provided for holding a demountable holographic plate in a predetermined position within a receptacle including a rectangular thin cassette having an aperture in which the holographic plate is permanently mounted, a receptacle in the form of a housing having a slot-like aperture which is configured so that the cassette is insertable in the housing, guide means including a substantially planar portion on the cassette to guide the cassette in a predetermined path within the housing, positioning means including at least one reference surface mounted within the housing and arranged so that the reference surface contacts the cassette when it is inserted into the housing, and locking means for holding the cassette firmly against the reference surface to maintain the holographic plate in said predetermined position.

By use of the above mounting arrangement, the positional relationship between the input display plate and the code plate of a hologram tablet device can be arbitrarily chosen by adjusting the cassette receptacle to the desired position. Once the receptacle is properly positioned, the cassette will be in the correct position each time it is inserted. This makes it possible to eliminate the need for the adjusting of the positional relationship between the display plate and code plate every time they are to be replaced. Thus, the present invention facilitates the replacement of the input display plate and the code plate, making the present device adaptable to various applications.

The other objects, features and advantages of the invention will become more apparent from the following description taken in conjunction with accompanying drawings, in which:

DESCRIPTION OF THE INVENTION

Figure 1:
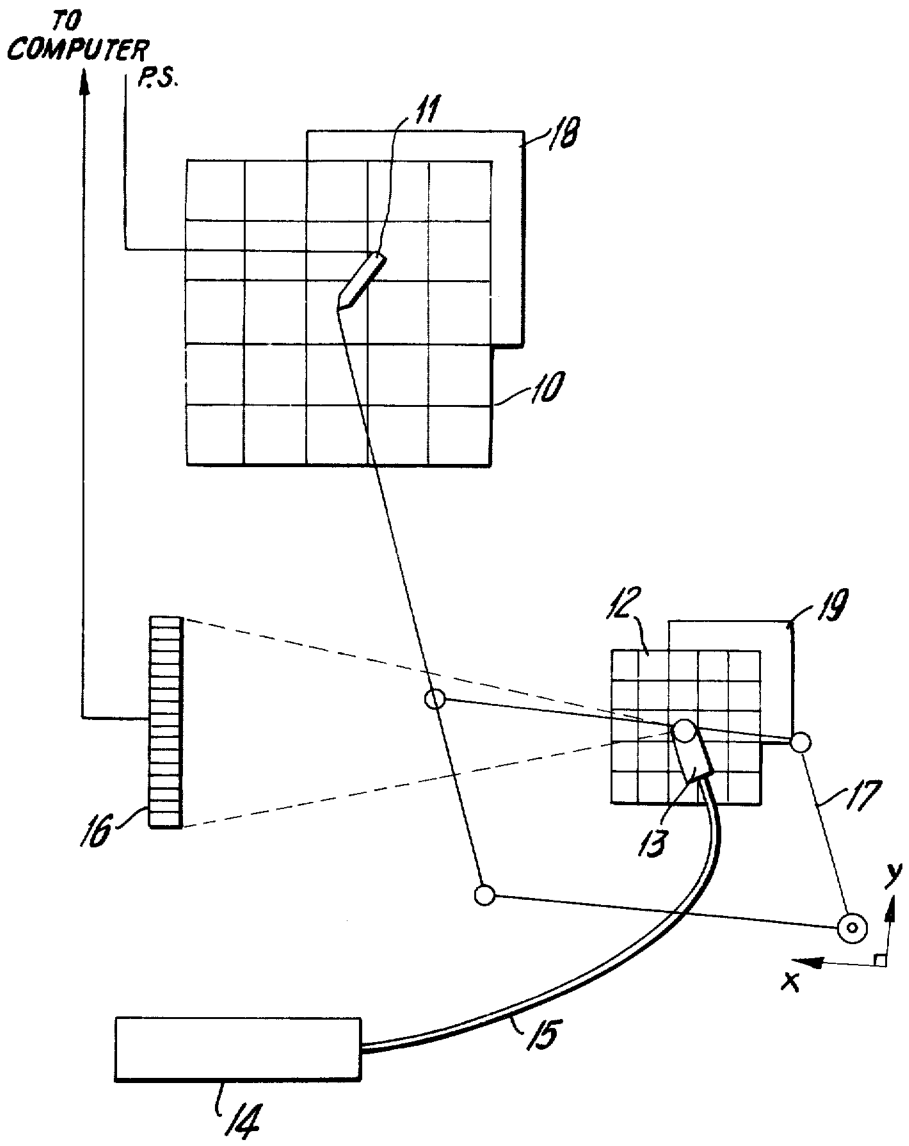
FIG. 1 is a schematic diagram showing the structure of an embodiment of the present invention.

Referring to FIG. 1, a character plate 10 is divided into a plurality of sections, which are respectively assigned to various Chinese characters and the like. As in the case of a Japanese typewriter, characters, symbols, marks, alphanumerics and the like may be printed in the respective sections. A pointer member 11 is movably mounted above the character plate 10 so that it can be used to scan the character plate. When pointer 11 is mechanically adjusted so that when the pointer 11 is brought into alignment with the center of any of the sections, a pen-down signal (P.S.) is generated. The pointer member 11 is attached to a pantograph 17 which is connected to a light pen 13. The light pen 13 is movable so that it can illuminate each of the elementary holograms recorded on a code plate 12. The elementary holograms on code plate 12 are arranged in one to one correspondence with the characters and other information on the character plate 10. A laser device 14 supplies coherent light to light pen 13 through a light transmission path 15. The light transmission path 15 may be made of an optical glass fiber. When one of the elementary holograms is illuminated by the coherent light rays from the light pen 13, the resulting diffracted light rays develop an optical image consisting of an array of bright and dark areas representing the character to be converted into a digital signal. A light detector 16 composed of an array of solar cells is disposed behind the code plate when the apparatus is viewed from the side of the code plate on which the light pen 13 is mounted so that the diffraction image consisting of the array of bright and dark areas falls on the detector 16 and is converted into an electric signal, which may be supplied directly to an electronic computer system or the like.

The character plate 10 is related to the code plate 12 by the pantograph link member 17. Accordingly, to enable the tablet device of the invention to function properly, the character plate 10 and the code plate 12 must be accurately positioned relative to each other. For this reason, the character plate 10 and the code plate 12 are fixed at predetermined points where a relative positional relationship is established between them. In the conventional holographic tablet, the positions of the character plate 10 and the code plate 12 are permanently fixed on the equipment when it is manufactured. However, when the positional relationship between the character plate 10 and the code plate 12 is fixed, the holographic tablet device is not very practical or flexible, because this arrangement does not permit the user to choose different code formats depending on his application.

With this in view, the device of the present invention enables at least the code plate 12 to be replaced by mounting the code plate in a removable cassette. Referring to FIG. 1, stops 18 and 19 are provided at given positions adjacent respectively to the character plate 10 and code plate 12 to orient these plates in predetermined positions. The peripheries of the character plate 10 and code plate 12 are brought respectively into contact with reference surfaces on the stops 18 and 19 to position the plates.

In the arrangement shown in FIG. 1, the stop 18 which is in contact with the periphery of character plate 10 is constructed integrally with the character plate 10 fixing the character plate 10 permanently in position. The code plate 12 is arranged to be mountable and dismountable so that the positional relationship between the character plate 10 and the code plate 12 can be easily adjusted. The stop 19 is adjusted to the correct position when the code plate 12 which is in contact with the stop 19 is positioned so that the character on character plate 10, chosen by pointer member 11, agrees with the code data obtained from the elementary hologram on code plate 12 which is illuminated by the light pen 13. The stop 19 is then fixed in position. The stop 19 is arranged so that it contacts areas on two edges of the code plate 12 and to insure that the code plate 12 doesn't slip out of position it is desirable that the stop 19 be arranged so that it is in contact with large areas of two edges of the code plate 12. Once the stop 19 has been adjusted to the proper position the code plate 12 can be removed and another plate can be substituted without readjusting the stop 19.

Figure 2:
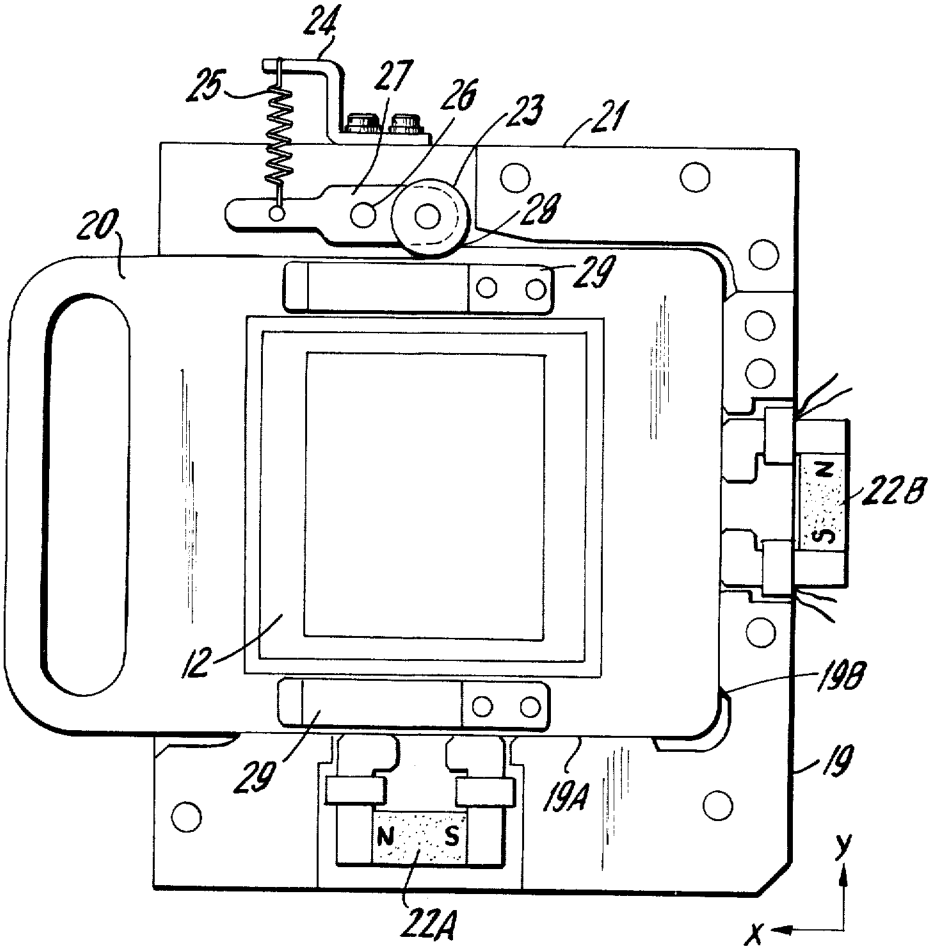
FIG. 2 is a schematic plan view of a cassette and a cassette holder for use in the device of the present invention.

FIG. 2 schematically illustrates one embodiment of the invention. In this embodiment, the code plate 12 is mounted on a cassette plate 20 of a standardized shape. A cassette holder 21 includes guides (not shown) on two sides which serve to guide the cassette plate 20 in the holder 21 toward the L-shaped stop 19. When the periphery of the cassette plate 20 comes in contact with *x*-direction guide portion 19A and *y*-direction guide portion 19B, which together constitute stop 19, microswitches (not shown) disposed in the guide portions

19A and 19B are operated respectively to actuate electromagnets 22A and 22B. Electromagnets 22A and 22B attract and hold the adjacent edges of cassette plate 20 in position. The cassette plate 20 is thus fixed exactly in position.

In this embodiment, a roller 23 is used to press the cassette plate 20 sideways toward the guide portion 19A thereby preventing the cassette plate 20 from being moved. More specifically, a bracket 24 is mounted on the body of the cassette holder 21. The bracket 24 supports one end of a bias spring 25, the other end of which is connected to one end of an arm 27. The arm 27 is pivotably mounted on a shaft 26. The roller 23 is disposed at the end of the arm 27 away from the spring 25.

The cassette plate includes a shoulder portion 28 on the side facing roller 23. The radius of curvature of this shoulder portion is equal to the radius of the roller 23, so that the roller face will come into close contact with the shoulder portion 28. In the cassette holder of the construction as described above, the spring 25 is contracted when the cassette plate 20 is not in the holder. With the spring 25 contracted the roller 23 is rotated clockwise causing the roller 23 to extend into the path of the cassette plate 20. When the cassette plate 20 is inserted onto the holder it comes into contact with the roller 23 causing the roller to pivot about shaft 26 and move upward and rotate as it moves along the top edge of plate 20. The coil spring 25 attached to the other end of the arm 27 expands as the roller 23 moves counterclockwise in an upward direction in FIG. 2. As the cassette plate is inserted farther into the holder and is firmly engaged by the stop 19 the roller 23 rolls down the shoulder portion 28 of the cassette plate 20 under pressure of bias spring 25 to push the plate 20 firmly against the lower portion of the holder, as seen in FIG. 2, and against the stop 19. Thus, side slip of the cassette plate 20 can be prevented without resorting to the electromagnets.

In the embodiment of FIG. 2, leaf springs 29 are disposed along the sides of the cassette plate 20. These leaf springs 29 compress on contacting the upper part of the guide structure which is not shown in the cutaway drawing of FIG. 2, and press the guide structure into firm contact with the bottom face of cassette holder 21. Alternatively, the springs 29 may be disposed on the other side of guide structure.

Although the foregoing embodiment permits only the code plate to be replaced, it is apparent that various alternative arrangements are possible. For example, the character plate may be replaced with a display plate. Similarly, the code plate having character code data may be replaced with a code plate having positional data. This last arrangement makes it possible to use the holographic tablet device in two ways. In this case, the indication plane of a character plate or the like must be arranged so that it is mountable and dismountable against the stopping device.

What is claimed is:

1. Mounting apparatus for holding a demountable plate in a predetermined position within a housing including a frame comprising a thin member having two substantially parallel major surfaces and an aperture extending therethrough in a direction perpendicular to said major surfaces, means for fixedly mounting said plate within said aperture in a plane parallel to said major surfaces of said member, a housing for holding said member having a slot-like aperture extending into said housing, said slot-like aperture being configured so that said member is insertable into said housing in a direction parallel to said major surfaces, guide means for guiding said member along a predetermined path within said housing, positioning means including at least one reference surface mounted within said housing so that said member contacts said at least one reference surface when said member is inserted into said housing, and locking means for holding said member firmly against said at least one reference surface to maintain said plate in said predetermined position, said locking means including at least one electromagnet and means to activate said electromagnet in response to pressure exerted by said member against said at least one reference surface.

2. Mounting apparatus as claimed in claim 1, in which said member is substantially rectangular in shape and in which said positioning means includes two reference surfaces which are arranged substantially perpendicularly with respect to each other and in which said reference surfaces are arranged so that each of said surfaces is contacted by one of the four edges constituting the periphery of said rectangular member when said member is fully inserted in said housing and in which said locking apparatus includes two electromagnets, one of said electromagnets being located adjacent to each of said reference surfaces and means responsive to pressure exerted by the contact of said member against said reference surfaces to activate said electromagnets.

3. Mounting apparatus as claimed in claim 1, including a roller pivotably mounted within said housing and a spring arranged to press said roller against said member, the periphery of said member having a portion with a radius of curvature substantially equal to the radius of said roller and said roller being in contact with said portion when said member is fully inserted.

* * * * *